United States Patent [19]

Zboril et al.

[11] Patent Number: 4,769,428

[45] Date of Patent: Sep. 6, 1988

[54] SOLUTION PROCESS FOR THE PREPARATION OF POLYMERS OF ALPHA-OLEFINS

[75] Inventors: Vaclav G. Zboril, Kingston, Canada; Rolf Mulhaupt, Bad Homburg, Fed. Rep. of Germany

[73] Assignee: Du Pont Canada Inc., Mississauga, Canada

[21] Appl. No.: 919,807

[22] Filed: Oct. 16, 1986

[30] Foreign Application Priority Data

Oct. 17, 1985 [CA] Canada ................................. 493164

[51] Int. Cl.$^4$ .......................... C08F 2/06; C08F 10/02
[52] U.S. Cl. ..................................... 526/84; 526/116; 526/165; 526/352; 502/113
[58] Field of Search ................................. 526/116, 84

[56] References Cited

U.S. PATENT DOCUMENTS

| | | | |
|---|---|---|---|
| 3,242,099 | 3/1966 | Manyik et al. | 526/165 |
| 4,490,514 | 12/1984 | Hoff et al. | 526/165 |
| 4,542,199 | 9/1985 | Kominsky et al. | 526/352 |

FOREIGN PATENT DOCUMENTS

| | | | |
|---|---|---|---|
| 1173599 | 8/1984 | Canada | 526/84 |
| 131420 | 1/1985 | European Pat. Off. | 526/84 |

*Primary Examiner*—Edward J. Smith

[57] ABSTRACT

A solution process, and a catalyst therefor, for the preparation of high molecular weight polymers of alph-olefins viz. homopolymers of ethylene and copolymers of ethylene and $C_3$–$C_{12}$ alpha-olefins, is disclosed. The process is operated under solution polymerization conditions at 105°–320°. The catalyst is obtained from titanium tetrahalides, vanadium oxytrihalides and organoaluminum compounds, in which an admixture of catalyst components is heat-treated at 150°–320° C., and activated with an aluminoxane. The catalyst has good activity and the polymer obtained has improved color.

1 Claim, No Drawings

SOLUTION PROCESS FOR THE PREPARATION OF POLYMERS OF ALPHA-OLEFINS

BACKGROUND OF THE INVENTION

1. Field of the Invention

The present invention relates to a process for the preparation of polymers of alpha-olefins, especially homopolymers of ethylene and copolymers of ethylene and higher alpha-olefins having improved colour. In particular the invention relates to a solution process for the preparation of polymers of alpha-olefins in which alpha-olefin monomer is polymerized in the presence of a coordination catalyst capable of being used at relatively high polymerization temperatures, especially temperatures above 150° C. The activator of the coordination catalyst is an aluminoxane.

2. Description of the Prior Art

Polymers of ethylene, for example, homopolymers of ethylene and copolymers of ethylene and higher alpha-olefins, are used in large volumes for a wide variety of end-uses, for example, in the form of film, fibres, moulded or thermoformed articles, pipe, coatings and the like.

There are two types of processes for the manufacture of polyethylene that involve the polymerization of monomers in the presence of a coordination catalyst viz. those which operate at temperatures below the melting or solubilization temperature of the polymer and those which operate at temperatures above the melting or solubilization temperature of the polymer. The latter are referred to as "solution" processes, an example of which is described in Canadian Patent No. 660 869 of A. W. Anderson, E. L. Fallwell and J. M. Bruce, which issued Apr. 9, 1963. In a solution process the process is operated so that both the monomer and polymer are soluble in the reaction medium. Under such conditions accurate control over the degree of polymerization, and hence the molecular weight of the polymer obtained, is achieved by control of the reaction temperature. It is believed that the termination reaction controlling the molecular weight of the polymer is highly dependent on temperature. The molecular use of relatively small amounts of hydrogen, as is described in Canadian Patent No. 703 704 of C. T. Elston, which issued Feb. 9, 1965.

There are a number of advantages to a solution polymerization process, for example, the ability to control the molecular weight of the polymer obtained, the ability to operate the process as a continuous process and to recover the polymer by precipitation without the need for washing, the efficient use of catalyst, the properties of the polymer obtained and the possibility of efficient use of energy.

A disadvantage of a solution process is that part of the catalyst remains in the polymer of ethylene. Such catalyst, which may be referred to herein as "catalyst residue", may contribute to the colour of the polymer obtained and to degradation of the polymer during subsequent processing of the polymer e.g., in extrusion, injection moulding and the like, and/or on exposure of fabricated articles to ultra violet light. The amount of catalyst residue is related, at least in part, to the overall activity of the catalyst employed in the polymerization step of the process as the higher the overall activity of the catalyst the less catalyst that is, in general, required to effect polymerization at an acceptable rate. Catalysts of relatively high overall activity are therefore preferred in solution polymerization processes.

Two important factors in determining the overall activity of a catalyst are the instantaneous activity of the catalyst and the stability of the catalyst under the operating conditions, especially at the operating temperature. Many catalysts that are stated to be very active in low temperature polymerization processes also exhibit high instantaneous activity at the higher temperatures used in solution processes. However such catalysts tend to decompose within a very short time in a solution process and thus the overall activity is disappointingly low. Such catalysts are of no commercial interest for solution processes. Other catalysts may exhibit acceptable overall activity at the higher temperatures of a solution process but show tendencies to yield polymers of broad molecular weight distribution or of too low a molecular weight to be commercially useful for the manufacture of a wide range of useful products. The requirements for and the performance of a catalyst in a solution polymerization process are quite different from those of a catalyst in a low temperature polymerization process, as will be understood by those skilled in the art.

A process for the preparation of polymers of ethylene at high temperatures in which the catalyst is a coordination catalyst consisting of titanium tetrachloride, a vanadium compound and aluminum trialkyl and capable of being used in a solution process is described in Canadian Patent No. 635 823 of D. B. Ludlum, N. G. Merckling and L. H. Rombach, which issued Feb. 6, 1962. The preparation of polymers of ethylene in the presence of heat-treated polymerization catalysts is described in published European patent application No. 57 050 of V. G. Zboril, M. A. Hamilton and R. W. Rees, published Aug. 4, 1982, and No. 56 684 of V. G. Zboril and M. A. Hamilton, published July 28, 1982. The preparation of polymers of ethylene in the presence of polymerization catalysts containing alkyl siloxalanes is described in European patent application No. 131 420 of M. A. Hamilton, D. A. Harbourne, C. G. Russell, V. G. Zboril and R. Mulhaupt, published Jan. 16, 1985.

Aluminoxanes have been used in the preparation of supported catalyst precursors, which are then activated to obtain the polymerization catalyst, as is disclosed in East German Patent No. 105 244 of Polyakov Z. N. which was published Apr. 12, 1974, U.S.S.R. Patent No. 749 421 of Polyakov Z. N. which was published July 25, 1980, and U.S.S.R. Patent No. 520 127 of A. I. Gorbunov et al. which was published Oct. 29, 1976. In addition, aluminoxanes have been used in zirconium-based homogeneous coordination catalysts for low temperature polymerization processes.

SUMMARY OF THE INVENTION

A solution polymerization process for the preparation of homopolymers of ethylene and copolymers of ethylene and higher alpha-olefins, in which the catalyst is a coordination catalyst prepared by heat-treating a particular admixture of a titanium halide, vanadium oxytrihalide and an organoaluminum compound and then activating with an aluminoxane compound has now been found. The catalyst has good activity and stability at the high temperatures employed in a solution polymerization process and results in polymer of improved colour.

Accordingly the present invention provides a solution process for the preparation of high molecular weight polymers of alpha-olefins selected from the group consisting of homopolymers of ethylene and copolymers of ethylene and $C_3$-$C_{12}$ alpha-olefins, said process comprising feeding monomer selected from the group consisting of ethylene and mixtures of ethylene and at least one $C_3$-$C_{12}$ alpha-olefin, a coordination catalyst and inert hydrocarbon solvent to a reactor, polymerizing said monomer at a temperature in the range of 105°–320° C. and recovering the polymer so obtained, said coordination catalyst having been obtained by combining a first component with a second component, said first component being prepared by a method selected from the group consisting of (i) admixing a solution of an organoaluminum compound in inert hydrocarbon solvent with a solution of titanium tetrahalide and vanadium oxytrihalide in inert hydrocarbon solvent at a temperature of less than 30° C. and heating the resultant admixture to a temperature of 150°–300° C. for a period of from 5 seconds to 60 minutes and (ii) admixing a solution of an organoaluminum compound in inert hydrocarbon solvent with a solution of titanium tetrahalide in inert hydrocarbon solvent at a temperature of less than 30° C., heating the resultant admixture to a temperature of 150°–300° C. for a period of from 5 seconds to 60 minutes and admixing vanadium oxytrihalide with the admixture so obtained, said organoaluminum compound being of the formula $AlR_nX_{3-n}$ and being admixed with the titanium and vanadium compounds so that the atomic ratio of aluminum in the first component to titanium plus vanadium is in the range 0.2–2.0 where R is alkyl, cycloalkyl, aryl or alkyl-substituted aryl and has 1–20 carbon atoms; n=1, 1.5, 2 or 3 and X is halogen, the improvement wherein the second component is a solution of an aluminoxane in inert hydrocarbon solvent.

In an embodiment of the process of the present invention, the aluminoxane is selected from the group consisting of aluminoxane of the formula $R'_2AlO(R'AlO)_mAlR'_2$ where each R' is independently selected from the group consisting of alkyl, cycloalkyl, aryl or alkyl-substituted aryl and has 1–20 carbon atoms and m is 0 or an integer.

In a preferred embodiment, the alkyl groups of the aluminoxane are alkyl or cycloalkyl, especially isobutyl, and m is 0 to 4.

In another embodiment, the catalyst components are mixed in-line and fed to the reactor without separation of any fraction therefrom.

In a further embodiment, the recovery of the polymer includes the steps of deactivating the catalyst in the solution obtained from the reactor by sequentially admixing therewith a minor amount of water followed by a solution of a salt of an alkaline earth metal or zinc and an aliphatic carboxylic acid dissolved in hydrocarbon solvent, separating the hydrocarbon solvent and other volatile matter from the resultant solution and recovering a composition comprising said high molecular weight polymer, the amount of water being 0.25–1.5 moles of water per mole of halogen plus alkyl radicals plus $R_2AlO$-groups.

In yet another embodiment, the recovered polymer is treated with saturated steam at about atmospheric pressure for a period of 1 to 16 hours. The steam temperature should be controlled below the agglomeration temperature of the polymer.

The present invention also provides a coordination catalyst for the preparation of high molecular weight polymers of alpha-olefins, said catalyst having been obtained by combining a first component with a second component, said first component being prepared by a method selected from the group consisting of (i) admixing a solution of an organoaluminum compound in inert hydrocarbon solvent with a solution of titanium tetrahalide and vanadium oxytrihalide in inert hydrocarbon solvent at a temperature of less than 30° C. and heating the resultant admixture to a temperature of 150°–300° C. for a period of from 5 seconds to 60 minutes and (ii) admixing a solution of an organoaluminum compound in inert hydrocarbon solvent with a solution of titanium tetrahalide in inert hydrocarbon solvent at a temperature of less than 30° C., heating the resultant admixture to a temperature of 150°–300° C. for a period of from 5 seconds to 60 minutes and admixing vanadium oxytrihalide with the admixture so obtained, said organoaluminum compound being of the formula $AlR_nX_{3-n}$ and being admixed with the titanium and vanadium compounds so that the atomic ratio of aluminum in the first component to titanium plus vanadium is in the range 0.2–2.0 where R is alkyl, cycloalkyl, aryl or alkyl-substituted aryl and has 1–20 carbon atoms; n=1, 1.5, 2 or 3 and X is halogen, the improvement wherein the second component is a solution of an aluminoxane in inert hydrocarbon solvent.

DETAILED DESCRIPTION OF THE INVENTION

The present invention is directed to a process for the preparation of high molecular weight polymers of alpha-olefins, such polymers being intended for fabrication into articles by extrusion, injection moulding, thermoforming, rotational moulding and the like. In particular the polymers of alpha-olefins are homopolymers of ethylene and copolymers of ethylene and higher alpha-olefins, especially such higher alpha-olefins having 3 to 12 carbon atoms i.e. $C_3$-$C_{12}$ alpha-olefins, examples of which are 1-butene, 1-hexene and 1-octene. In addition cyclic endomethylenic dienes may be fed to the process with the ethylene or mixtures of ethylene and $C_3$-$C_{12}$ alpha-olefin. Such polymers are known.

In the process of the present invention, monomer, a coordination catalyst and inert hydrocarbon solvent are fed to a reactor. The monomer may be ethylene or mixtures of ethylene and at least one $C_3$-$C_{12}$ alpha-olefin, preferably ethylene or mixtures of ethylene and one $C_4$-$C_{10}$ alpha-olefin. The coordination catalyst is formed by combining a first component with a second component. Two methods may be used to obtain the first component. In one method, the first component is obtained by admixing, rapidly, a solution of an organoaluminum compound in inert hydrocarbon solvent with a solution of titanium tetrahalide and vanadium oxytrihalide in inert hydrocarbon solvent so that the atomic ratio of aluminum to titanium plus vanadium is in the range of 0.2–2.0, especially 0.3–1.0. The preferred ratio may depend on the particular organoaluminum compound used in the preparation of the catalyst. The resultant admixture is then heat treated at 150°–300° C. for a period of 5 seconds to 60 minutes, especially 10 seconds to 10 minutes.

In the second method, the first component is obtained by admixing, rapidly, a solution of an organoaluminum compound in inert hydrocarbon solvent with a solution of titanium tetrahalide in inert solvent. The resultant admixture is then heat-treated at 150°–300° C. for a period of 5 seconds to 60 minutes, especially 10 seconds to 10 minutes. Vanadium oxytrihalide, optionally admixed with titanium tetrahalide, is then admixed with the heat-treated admixture so that the atomic ratio of aluminum to titanium plus vanadium is in the range of 0.2-2.0, especially 0.3-1.0. The preferred ratio may depend on the particular organoaluminum compound used in the preparation of the catalyst.

The organoaluminum compound is of the general formula $AlR_nX_{3-n}$ where R is an alkyl, cycloalkyl, aryl or alkyl-substituted aryl and has 1 to 20 carbon atoms, n is 3, 2, 1.5 or 1, and X is a halogen. In preferred embodiments n is 3 or, especially, 2. R is preferably phenyl or alkyl, particularly alkyl of 1-4 carbon atoms. X is preferably bromine or chlorine. In preferred embodiments the organoaluminum compound is trialkyl aluminum, especially triethyl aluminum, or dialkylaluminum chloride, especially diethylaluminum chloride.

The second component is a solution of an aluminoxane in inert hydrocarbon solvent. The aluminoxane may be of the formula $R'_2AlO(R'AlO)_mAlR'_2$ where each $R'$ is independently selected from the group consisting of alkyl, cycloalkyl, aryl or alkyl-substituted aryl and has 1-20 carbon atoms, especially alkyl or cycloalkyl of 1-6 carbon atoms, and m is 0 or an integer, preferably 0 to 4. Preferably the alkyl groups are methyl, ethyl or butyl, especially isobutyl. Examples of such aluminoxanes are $(i-Bu)_2AlOAl(i-Bu)_2$ and $(i-Bu)_2AlOAl(i-Bu)OAl(i-Bu)_2$, and isomers thereof, where i-Bu=isobutyl. Alternatively, the aluminoxane may be of the formula

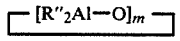

where each $R''$ is as defined above for $R'$ and m is an integer having a value of at least 2. Methods for the preparation of such aluminoxanes are known in the art.

The preferred halides of the titanium and vanadium compounds are bromine and especially chlorine.

In the process of the present invention the first component contains both titanium tetrahalide and vanadium oxytrihalide, preferably vanadium oxytrichloride. The solution of titanium tetrahalide and vanadium oxytrihalide is such that the atomic ratio of aluminum to titanium plus vanadium in the first component is in the range 0.2-2.0 and the ratio of aluminoxane in the second component to titanium plus vanadium, on a molar basis, is desirably in the range 0.9-10, preferably 1.0-4.0. In a preferred embodiment of the process of the present invention the ratio of titanium to vanadium on an atomic basis is at least 0.25:1. In particularly preferred embodiments, the ratio of titanium to vanadium on an atomic basis is in the range 0.5:1 to 30:1 and especially 0.6:1 to 10:1. A preferred range is 0.8:1 to 1.2:1.

The concentration of the components of the solutions used in the preparation of the catalyst is not critical and is primarily governed by practical considerations. The combining of the components is exothermic and the resultant evolution of heat is a factor in determining the upper concentration limits of the solutions. Concentrations up to about 50%, on a weight basis, may however be used. The lower concentration limits are related to practical considerations for example, the amount of solvent required, the equipment being used and the like. Concentrations of as low as 25 ppm, on a weight basis, may be used but higher concentrations, for example 100 ppm and above, are preferred.

It is important to admix the two solutions of the first component at ambient or lower temperatures i.e. lower than 30° C., and permit reaction to occur for some minimum time. This time depends on the type of organoaluminum compound used and may be as short as 15 seconds after adequate mixing has been achieved. The subsequent heat treatment of the admixture of the first component may be performed by, for example, heating the admixture in a heat exchanger or by addition of a heated inert hydrocarbon solvent. Heat treatment is carried out at 150°-300° C., especially 170° to 250° C. The admixture should be held at the elevated temperature for a period of time in the range of from 5 seconds to 60 minutes, preferably 10 seconds to 10 minutes and especially 1 to 3 minutes, before it is combined with a second component.

The first component may be fed into the polymerization reactor separately from the second component or the first and second components may be combined prior to being fed to the reactor.

The solvent used in the preparation of the coordination catalyst is an inert hydrocarbon, in particular a hydrocarbon that is inert with respect to the coordination catalyst. Such solvents are known and include for example, hexane, heptane, octane, cyclohexane, methylcyclohexane and hydrogenated naphtha. The solvent used in the preparation of the catalyst is preferably the same as that fed to the reactor for the polymerization process.

The coordination catalyst described herein is used in the process of the present invention without separation of any of the components of the catalyst. In particular neither liquid nor solid fractions are separated from the catalyst before it is fed to the reactor. Thus the preparation of the catalyst is a simple procedure and in a preferred embodiment involves in-line mixing and heat-treatment of the catalyst that is to be fed to the reactor.

The catalyst described herein may be used, according to the process of the present invention, over the wide range of temperature that may be used in an alpha-olefin polymerization process operated under solution conditions. For example, such polymerization temperatures may be in the range of 105°-320° C. and especially in the range 105°-310° C. The pressures used in the process of the present invention are those known for solution polymerization processes, for example, pressures in the range of about 4-20 MPa.

In the process of the present invention the alpha-olefin monomers are polymerized in the reactor in the presence of the catalyst. Pressure and temperature are controlled so that the polymer formed remains in solution. Small amounts of hydrogen, for example 1-40 parts per million by weight, based on the total solution fed to the reactor, may be added to the feed in order to improve control of the melt index and/or molecular weight distribution and thus aid in the production of a more uniform product, as is disclosed in the aforementioned Canadian Patent No. 703 704. The catalyst is usually deactivated, for example by contacting with a fatty acid, an alkaline earth metal salt of an aliphatic carboxylic acid or an alcohol, immediately after the polymer leaves the reactor.

In a preferred embodiment of the present invention, the catalyst is deactivated immediately after the polymer leaves the reactor using a two-stage deactivator system. The catalyst is admixed, sequentially, with a minor amount of water followed by a solution of either (a) a salt of an alkaline earth metal or zinc and an aliphatic monocarboxylic acid dissolved in hydrocarbon solvent or (b) a solution of an alcohol dissolved in hydrocarbon solvent. A solution of such a salt is preferred, especially a calcium salt of a $C_8/C_{10}$ carboxylic acid e.g.

the calcium salt of 2-ethyl hexanoic acid. A slurry of an alkaline earth metal salt of an aliphatic monocarboxylic acid, e.g. calcium stearate, in hydrocarbon solvent may be used as the second deactivator.

The amount of water added is preferably 0.25–1.5 moles of water, especially about one mole of water, per mole of halogen plus alkyl plus R'$_2$AlO-radicals, were R' is as defined hereinbefore. The second part of the deactivator, e.g. the alkaline earth metal salt, is used in an amount that is 1.0 to 2.0 times the stoichiometric amount of halogen radicals. The second deactivator may contain excess carboxylic acid or hydroxylic solubilizing aids that should be chosen so as to optimize the colour of the polymer subsequently obtained. It is preferred that the salt be added after any solution heaters but prior to the flashing off of solvent.

Embodiments of the preferred deactivator are disclosed in published European patent application No. 67 645 of M. A. Hamilton, D. A. Harbourne and V. G. Zboril, published Dec. 22, 1982.

The hydrocarbon solvent used for the deactivator is preferably the same as the solvent used in the polymerization process. If a different solvent is used, it must be compatible with the solvent used in the polymerization process, not cause precipitation of any component of the polymerization mixture and not cause adverse effects on the solvent recovery system associated with the polymerization process.

After deactivation of the catalyst the polymer may be passed through a bed of activated alumina or bauxite which removes part or all of the deactivated catalyst residues; however, under some circumstances it may not be necessary to remove such residues from the polymer. The solvent may then be flashed off from the polymer which subsequently may be extruded into water and cut into pellets or other suitable comminuted shapes. The recovered polymer may then be treated with saturated steam at atmospheric pressure to, for example, reduce the amount of volatile materials and improve polymer colour. The treatment may be carried out for about 1 to 16 hours, following which the polymer may be dried and cooled with a stream of air for 1 to 4 hours. Pigments, antioxidants and other additives may be added to the polymer either before or after the polymer is initially formed into pellets or other comminuted shapes.

The antioxidant incorporated into polymer obtained from the process of the present invention may, in embodiments, be a single antioxidant e.g. a hindered phenolic antioxidant, or a mixture of antioxidants e.g. a hindered phenolic antioxidant combined with a secondary antioxidant e.g. a phosphite. Both types of antioxidant are known in the art. For example, the ratio of phenolic antioxidant to secondary antioxidant may be in the range 0.25:1 to 1:1 with the total amount of antioxidant being in the range of 400 to 2000 ppm.

As is illustrated in the examples below, the heat-treated catalyst activated with an aluminoxane exhibits good stability at very high temperatures and results in the formation of polymer of improved colour when compared with polymer obtained with a catalyst activated with an organoaluminum compound or an alkylsiloxalane. It will also be noted that the aluminoxane is added after heat-treatment of the catalyst and that the catalyst may be prepared by in-line mixing of liquid components without isolation, separation and/or purification of any intermediate products, which greatly reduces the cost of using such catalyst.

The process of the present invention may be used to prepare homopolymers of ethylene and copolymers of ethylene and higher alpha-olefins having densities in the range of, for example, about 0.900–0.970 g/cm$^3$ and especially 0.915–0.965 g/cm$^3$; the polymers of higher density, e.g. about 0.960 and above, being homopolymers. Such polymers may have a melt index, as measured by the method of ASTM D-1238, condition E, in the range of, for example, about 0.1–200, and especially in the range of about 0.3–120. The polymers may be manufactured with narrow or broad molecular weight distribution. For example, the polymers may have a stress exponent, a measure of molecular weight distribution, in the range of about 1.1–2.5 and especially in the range of about 1.3–2.0. Stress exponent is determined by measuring the throughput of a melt indexer at two stresses (2160 g and 6480 g loading) using the procedures of the ASTM melt index test method, and the following formula:

$$\text{Stress exponent} = \frac{1}{0.477} \log \frac{\text{(wt. extruded with 6480 g wt.)}}{\text{(wt. extruded with 2160 g wt.)}}$$

Stress exponent values of less than about 1.40 indicate narrow molecular weight distribution while values above about 2.00 indicate broad molecular weight distribution.

The polymers produced by the process of the present invention are capable of being fabricated into a wide variety of articles, as is known for homopolymers of ethylene and copolymers of ethylene and higher alpha-olefins.

Unless otherwise noted, in the examples hereinafter the following procedures were used:

The reactor was a 70 ml (depth=11.3 mm, diameter=88.9 mm) pressure vessel fitted with a six-bladed agitator having a diameter of 66.7 mm, a heating jacket, pressure and temperature controllers, two feed lines and an outlet line. The feed lines were located adjacent to the tips of the agitator blades while the outlet line was adjacent to the centre of the agitator. The catalyst precursors and other ingredients were prepared as solutions in cyclohexane which had been purified by being passed through a silica gel bed, stripped with nitrogen and passed through another silica gel bed followed by beds of 4X molecular sieve and of alumina. Ethylene was metered directly into the reactor. The rates of feed of the components of the catalyst were adjusted to produce the desired conditions in the reactor. The desired hold-up times were achieved by adjusting the length of the tubing through which the components were being passed. The reactor pressure was kept constant at 10 MPa. The pumping rates and temperatures were maintained constant during each experiment.

The initial (no conversion) monomer concentration in the reactor was 1–4 wt.%. A solution of deactivator (water, about 200 ppm) in cyclohexane was injected into the reactor effluent at the reactor exit, followed by a solution of a second deactivator (calcium 2-ethyl hexanoate (40 mM)) in cyclohexane. The pressure of the stream was then reduced to about 110 kPa (Abs.) and the unreacted monomer was continuously stripped off with nitrogen. The amount of unreacted monomer was monitored by gas chromatograph. The catalyst activity was defined as:

$$Kp = \frac{S.V. \times d[Q/(1-Q)]}{dc}$$

where Q is the conversion, i.e. the fraction of ethylene (monomer) converted to polymer at the optimum ratio of the first and second components, S.V. is the space velocity in the stirred reactor in min$^{-1}$ and c is the catalyst concentration, based on titanium plus vanadium, in the reactor in mmol/l. Kp was obtained by measuring the conversion Q at various concentrations of the transition metals (Ti, V) in the catalyst.

The present invention is illustrated by the following examples. In the examples the solvent was cyclohexane and the monomer was ethylene unless specified to the contrary.

EXAMPLE I

Catalyst was prepared by in-line mixing of (i) a solution of titanium tetrachloride (0.5 mmoles/liter) and vanadium oxytrichloride (0.5 mmoles/liter) in cyclohexane with (ii) a solution of 1.9 mmoles/liter of diethylaluminum chloride in cyclohexane, the atomic ratio of aluminum to titanium plus vanadium being 1.90:1. After about 30 seconds, a stream of hot cyclohexane was injected into the catalyst mixture, the resultant stream having a temperature of 210° C. The stream was maintained at this temperature for about one minute.

The resultant catalyst solution was fed to the polymerization reactor. A second solution containing the second component (activator) of the catalyst was separately fed to the reactor. The ethylene concentration in the reactor was 2.7% by weight and the temperature was 235° C. The effluent from the reactor was deactivated as described above. Further details and the results obtained are given in Table I.

TABLE I

|  | Run No. | | | |
| --- | --- | --- | --- | --- |
|  | 1 | 2 | 3 | 4 |
| Catalyst Activator* | A | B | C | D |
| Catalyst Activity (Kp) | 119 | 80 | 94 | 73 |
| Polymer | | | | |
| Melt Index | 1.05 | 1.14 | 0.96 | |
| Stress Exponent | 1.39 | 1.40 | 1.42 | |

*A = Me$_2$EtSi—O—Al—Et$_2$, where Me = methyl, Et = ethyl
B = (iBu)$_2$Al—O—Al(iBu)$_2$, where iBu = iso-butyl
C = (iBu)$_2$Al—(O—AliBu)$_2$-O—Al(iBu)$_2$, where iBu = iso-butyl
D = triethyl aluminum
Runs 1 and 4 are comparative runs.

The results show that aluminoxanes are effective as catalyst activators in a solution polymerization process.

EXAMPLE II

In experiments to measure the colour of polymer produced using aluminoxanes as the second catalyst component, catalyst was prepared using the procedure of Example I. Ethylene was polymerized as in Example I except that the ethylene concentration in the reactor was about 15% by weight. The effluent from the reactor was passed through a 4.57 mm ID tubing heated to a temperature of 286° C. prior to injection of the first deactivator. The hold-up time in the tube was about 0.2 minutes. A solution of water (40 mmoles/liter) in hot cyclohexane was injected into the effluent and the resultant stream was passed through a further length of 4.57 mm ID tubing, heated to 320° C., for a hold-up time of about 2.8 minutes. A solution of calcium 2-ethyl hexanoate in cyclohexane (40 mmoles/liter) was injected into the stream which was maintained at 320° C. for a further minute. Antioxidants were then admixed into the resultant stream which was flashed into the barrel of a ram extruder heated to about 220° C., the gaseous matter obtained being removed from the extruder. The molten polymer obtained was periodically extruded into a mould having a depth of 1 mm and a diameter of 40 mm, and then rapidly cooled to ambient temperature. The colour of the plaques thus obtained were measured on a Hunter* L,a,b colourimeter, the measurement being on four plaques stacked in a holder having a black background.

*denotes trade mark

The ratio of water, of the first deactivator, to the combined amount of alkyl and chlorine groups in the catalyst and activator components was 1:2. Similarly, the ratio of calcium, in the second deactivator, to the chlorine in the catalyst was 2:3. The antioxidants used were Irganox* 1076 and Irgafos* 168 at 1100 ppm and 740 ppm, respectively.

Further details are given in Table II.

TABLE II

|  | Run No. | | |
| --- | --- | --- | --- |
|  | 5 | 6 | 7 |
| Catalyst Activator** | A | B | C |
| Plaque Colour | | | |
| L | 73.6 | 74.2 | 74.4 |
| b | −1.9 | −2.17 | −2.39 |

**As in TABLE I
Run 5 is a comparative run.

The results show that polymer of good colour may be obtained, the colour of the polymers obtained in Runs 6 and 7 being superior to that of the polymer of comparative Run 5. It is known from the aforementioned Canadian patent application No. 458 019 that alkyl siloxalane catalyst activators tend to give polymer of better colour than triethyl aluminum activators; thus the above aluminoxanes tend to provide product of better colour than either such activators.

We claim:

1. In a solution process for the preparation of high molecular weight polymers of alpha-olefins selected from the group consisting of homopolymers of ethylene and copolymers of ethylene and C$_3$–C$_{12}$ alpha-olefins, said process comprising feeding monomer selected from the group consisting of ethylene and mixtures of ethylene and at least one C$_3$–C$_{12}$ alpha-olefin, a coordination catalyst and inert hydrocarbon solvent to a reactor, polymerizing said monomer at a temperature in the range of 105°–320° C. and recovering the polymer so obtained by a sequence of steps of deactivating the catalyst in the solution obtained from the reactor by sequentially admixing therewith a minor amount of water followed by a solution of a salt of an alkaline earth metal or zinc and an aliphatic carboxylic acid dissolved in hydrocarbon solvent, separating the hydrocarbon solvent and other volatile matter from the resultant solution and recovering a composition comprising said high molecular weight polymer, the amount of water being 0.25–1.5 moles of water per mole of chlorine plus alkyl radicals plus R$_2$AlO-groups in the coordination catalyst; said coordination catalyst having been obtained by combining a first component with a second component, said first component being prepared by a method selected from the group consisting of (i) admixing a solution of an organoaluminum compound in inert hydrocarbon solvent with a solution of titanium tetrachloride and vanadium oxytrichloride in inert hydrocarbon solvent at a temperature of less than 30° C. and heating the resultant admixture to a temperature of 150°–300° C. for a period from 5 seconds to 60 minutes and (ii) admixing a solution of an organoaluminum compound in inert hydrocarbon solvent with a solution of titanium tetrachloride in inert hydrocarbon solvent at a temperature of less than 30° C., heating the resultant admixture to a temperature of 150°–300° C. for a period of from 5 seconds to 60 minutes and admixing vanadium oxytrichloride with the admixture so obtained, said organoaluminum compound being of the formula $AlR_nX_{3-n}$ and being admixed with the titanium and vanadium compounds so that the atomic ratio of aluminum in the first component to titanium plus vanadium is in the range of 0.2–2.0 where R is alkyl and has 1–20 carbon atoms; $n=1$, 1.5, 2, or 3 and X is halogen, said catalyst components being mixed in-line and fed to the reactor without separation of any component thereof, the improvement wherein the second component is a solution of an aluminoxane in inert hydrocarbon solvent, and the aluminoxane is selected from the group consisting of (i) aluminoxanes of the formula $R'AlO(R'AlO)_m$-$AlR'_2$, where each R' is independently selected from alkyl and cycloalkyl having 1–20 carbon atoms and m is 0 or an integer, and (ii) cyclic aluminoxanes of the formula

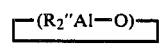

where each R" is independently selected from alkyl and cycloalkyl of 1–20 carbon atoms and m is an integer having a value of at least 2, the ratio of aluminoxane to titanium plus vanadium in the second component being in the range of 0.9–10 on a molar basis.

* * * * *